United States Patent
Konomi et al.

(10) Patent No.: US 11,186,715 B2
(45) Date of Patent: Nov. 30, 2021

(54) POLYPHENYLENE ETHER RESIN COMPOSITION AND VEHICLE LIGHTING FIXTURE BEZEL

(71) Applicants: ASAHI KASEI KABUSHIKI KAISHA, Tokyo (JP); KOITO MANUFACTURING CO.,LTD., Tokyo (JP)

(72) Inventors: Yasuaki Konomi, Tokyo (JP); Masahiko Niino, Tokyo (JP); Hidetaka Anma, Shizuoka (JP); Kazuhito Osada, Shizuoka (JP); Takashi Furui, Shizuoka (JP)

(73) Assignees: ASAHI KASEI KABUSHIKI KAISHA, Tokyo (JP); KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 17/011,030

(22) Filed: Sep. 3, 2020

(65) Prior Publication Data

US 2021/0061995 A1   Mar. 4, 2021

(30) Foreign Application Priority Data

Sep. 3, 2019   (JP) .............................. JP2019-160720

(51) Int. Cl.
| | | |
|---|---|---|
| *C08L 71/12* | (2006.01) | |
| *C08L 53/02* | (2006.01) | |
| *C08L 25/08* | (2006.01) | |
| *B29L 31/30* | (2006.01) | |
| *B29C 45/00* | (2006.01) | |

(52) U.S. Cl.
CPC .......... *C08L 71/12* (2013.01); *B29C 45/0001* (2013.01); *C08L 25/08* (2013.01); *C08L 53/025* (2013.01); *B29C 2945/7604* (2013.01); *B29C 2945/76006* (2013.01); *B29C 2945/76066* (2013.01); *B29L 2031/3055* (2013.01); *C08L 2201/08* (2013.01); *C08L 2203/30* (2013.01); *C08L 2205/025* (2013.01); *C08L 2205/035* (2013.01)

(58) Field of Classification Search
CPC .......... C08L 25/08; C08L 25/06; C08L 25/04; C08L 71/12; C08L 53/025; C08L 53/02; C08L 2205/03; C08L 2205/035; C08L 2205/025

See application file for complete search history.

(56) References Cited

U.S. PATENT DOCUMENTS

| | | | | |
|---|---|---|---|---|
| 2002/0035206 A1* | 3/2002 | Kurasawa | ............... | C08L 23/12 525/132 |
| 2012/0071599 A1 | 3/2012 | Yamaguchi et al. | | |
| 2012/0214929 A1 | 8/2012 | Fishburn et al. | | |
| 2013/0267641 A1 | 10/2013 | Yamaguchi et al. | | |
| 2016/0053114 A1 | 2/2016 | Yamaguchi | | |
| 2017/0313877 A1* | 11/2017 | Yamaguchi | ............... | C08J 5/00 |
| 2019/0367724 A1* | 12/2019 | Hisasue | ................... | A61J 1/10 |

FOREIGN PATENT DOCUMENTS

| | | |
|---|---|---|
| EP | 0401690 A2 | 12/1990 |
| EP | 0675166 A1 | 10/1995 |
| JP | H04500094 A | 1/1992 |
| JP | H05320495 A | 12/1993 |
| JP | H07268151 A | 10/1995 |
| JP | H09167511 A | 6/1997 |
| JP | H1196805 A | 4/1999 |
| JP | 2012164577 A | 8/2012 |
| JP | 2014047343 A | 3/2014 |
| JP | 2014507537 A | 3/2014 |
| JP | 2016138200 A | 8/2016 |
| WO | 2010134608 A1 | 11/2010 |
| WO | 2012070592 A1 | 5/2012 |
| WO | 2014171461 A1 | 10/2014 |

* cited by examiner

Primary Examiner — Jeffrey C Mullis
(74) Attorney, Agent, or Firm — Kenja IP Law PC

(57) ABSTRACT

Provided are a polyphenylene ether resin composition having excellent fluidity and heat resistance, and a vehicle lighting fixture bezel formed of this resin composition and having light weight, excellent external appearance, and low water absorbency. The resin composition contains: (A) 42-57 mass % of a polyphenylene ether resin having a reduced viscosity of 0.39-0.43 dL/g (in chloroform solvent at 30° C.); (B) 11-26 mass % of a polyphenylene ether resin having a reduced viscosity of 0.31-0.34 dL/g (in chloroform solvent at 30° C.); (C) 9-15 mass % of a block copolymer including a vinyl aromatic hydrocarbon polymer block (c1) and a hydrogenated conjugated diene polymer block (c2); and (D) 15-23 mass % of a homopolymer of a vinyl aromatic hydrocarbon. The (C) block copolymer includes 62-70 mass % of vinyl aromatic hydrocarbon-derived monomer units, has a weight-average molecular weight Mw of 50,000-70,000, and has a molecular weight distribution Mw/Mn (Mn is number-average molecular weight) of 1.00-1.30.

9 Claims, No Drawings

US 11,186,715 B2

POLYPHENYLENE ETHER RESIN COMPOSITION AND VEHICLE LIGHTING FIXTURE BEZEL

TECHNICAL FIELD

The present disclosure relates to a polyphenylene ether resin composition and a vehicle lighting fixture bezel formed of the same composition.

BACKGROUND

Polyphenylene ether resins have various characteristics such as excellent mechanical properties, electrical properties, acid and alkali resistance, and heat resistance, low specific gravity, low water absorbency, and good dimensional stability. Consequently, polyphenylene ether resins are widely used as materials for home appliances, OA devices, office machines, information devices, automobiles, and so forth.

The use of polyphenylene ether resin compositions is also anticipated in automobile lamp peripheral components (for example, housings, reflectors, and bezels) and light-reflecting shaped products of various types of lighting equipment due, in particular, to polyphenylene ether resin compositions having characteristics of low specific gravity and high heat resistance.

In particular, there has been increasing demand for lower weight, smaller thickness, and good surface appearance of automobile lamp peripheral components such as vehicle lighting fixture bezels in recent years, and in a case in which a polyphenylene ether resin composition is used in such applications, there is demand for even higher heat resistance and rigidity, good shaping fluidity, high light-reflecting characteristics, and ease of aluminum vapor deposition. Moreover, a shaped article of such a polyphenylene ether resin composition is expected to have good surface appearance and brightness.

In terms of techniques related to automobile lamp peripheral components formed of polyphenylene ether resin compositions, Patent Literature (PTL) 1, for example, discloses a reflective plate for a vehicle lighting fixture that is shaped from a thermoplastic resin composition having, as a main component, a polyphenylene ether resin having a specific heat deflection temperature and tensile strength retention rate, and that has excellent heat resistance, shaping processability, and hydrolysis resistance.

PTL 2 discloses a thermoplastic resin composition that has excellent fluidity and external appearance of an obtained shaped article as a result of containing a polyphenylene ether resin, a polystyrene resin having a specific weight-average molecular weight and number of branching points for the Z-average molecular weight, and an optional rubbery polymer.

PTL 3 discloses a lamp reflector that is shaped from a polyphenylene ether resin shaping material having a specific particle size and heat deflection temperature, that includes a metal reflective plate formed by a dry method, and that has excellent heat resistance, image clarity, and mechanical properties.

PTL 4 discloses that a modified polyphenylene ether resin can suitably be used in a thermoplastic resin layer of an bezel in a reflective component of a headlight or the like.

PTL 5 discloses that a vehicle lighting fixture peripheral component having high heat resistance, rigidity, and surface smoothness and having excellent aluminum vapor deposition external appearance and fogging properties under high-temperature conditions is obtained by using a resin composition that contains a polyphenylene ether resin in a specific ratio and has specific fogging properties.

PTL 6 discloses a resin composition that as a result of containing a specific amount of a polyphenylene ether and having a prescribed specific gravity, has low specific gravity, a balance of good heat resistance and shaping fluidity, and excellent shaped article glossiness and brightness, and also discloses a vehicle lighting fixture bezel shaped product that contains this resin composition.

PTL 7 discloses a high-brightness and low-gas, thin-walled resin reflector having excellent retention of external appearance, and particularly surface reflectance, before and after thermal aging of a thin-walled part that is formed of a resin composition containing, in a specific ratio, a polyphenylene ether resin, a polystyrene resin, and a rubber polymer including a hydrogenated block copolymer having a specific molecular weight, and that has been subjected to metal vapor deposition such as aluminum vapor deposition.

PTL 8 discloses an injection molded article (automobile headlight bezel) that is shaped from a composition containing, in a specific ratio, a poly(arylene ether), rubber-modified polystyrene containing rubber particles having a specific volume-average particle diameter, a hydrogenated block copolymer that includes a specific amount of a poly(alkenyl aromatic) and has a specific weight-average molecular weight, and a hydrocarbon resin, that is lighter than corresponding articles produced from mineral-filled and non-filled polyester, and that contributes to improving fuel efficiently without sacrificing impact strength, heat resistance, glossiness, and melt flow characteristics.

PTL 9 discloses a black-colored shaped product and a light-reflecting shaped product that as a result of being shaped from a resin composition containing, in a specific ratio, a polyphenylene ether, a styrenic resin, and carbon black and having not more than a specific number of white spots present in specific area of a mirror part of the shaped product surface, have low specific gravity, an extremely low number of white spots at the shaped product surface, and excellent aluminum vapor deposition external appearance.

PTL 10 discloses a shaped product for a light-reflecting component that is shaped from a resin composition containing, in a specific ratio, a polyphenylene ether and a styrene-acrylonitrile resin containing a specific amount of acrylonitrile, and that has an extremely low number of white spots at the shaped product surface after aluminum vapor deposition while, at the same time, being resistant to the occurrence of silvering at the shaped product surface under shaping conditions involving residence at high-temperature.

CITATION LIST

Patent Literature

PTL 1: JP H05-320495 A
PTL 2: JP H07-268151 A
PTL 3: JP H09-167511 A
PTL 4: JP H11-96805 A
PTL 5: WO 2010/134608 A1
PTL 6: WO 2012/070592 A1
PTL 7: JP 2012-164577 A
PTL 8: JP 2014-507537 A
PTL 9: JP 2016-138200 A
PTL 10: JP 2014-47343 A

SUMMARY

However, there is room for improvement in terms that conventional polyphenylene ether resin compositions such as disclosed in the cited literature do not necessarily have sufficient fluidity for injection molding by a full shot in order to achieve high strength and enhanced external appearance for a thin-walled (for example, 2.5 mm or less in thickness) shaped article that is large in size such as a vehicle lighting fixture bezel. Moreover, it is desirable for a vehicle lighting fixture bezel to have excellent surface appearance and brightness, but a shaped article formed of a conventional polyphenylene ether resin composition may have surface defects due to deformation according to thermal history, blistering in a hot and humid environment, or the like. Furthermore, a vehicle lighting fixture bezel is typically used inside an air-tight structure, and particularly in accompaniment to the adoption of LEDs for lighting, a temperature difference between the internal temperature of a vehicle lighting fixture and outside air may cause condensation to form on the inner surface of a transparent cover present at the front surface of the vehicle lighting fixture and may reduce lamp illuminance in a case in which a resin having high water absorbency is used.

Accordingly, an object of the present disclosure is to provide a polyphenylene ether resin composition that has excellent fluidity and heat resistance, and a vehicle lighting fixture bezel that is formed of this resin composition and that has light weight, excellent external appearance, and low water absorbency.

As a result of diligent investigation conducted with the aim of solving the problems set forth above, the inventors discovered that a polyphenylene ether resin composition having excellent fluidity and heat resistance is obtained through the inclusion of specific amounts of two types of polyphenylene ether resins having different reduced viscosities, a block copolymer that includes a vinyl aromatic hydrocarbon polymer block and a hydrogenated conjugated diene polymer block and that has a specific molecular weight and molecular weight distribution, and a homopolymer of a vinyl aromatic hydrocarbon, and that a vehicle lighting fixture bezel having light weight, excellent external appearance, and low water absorbency is obtained through this resin composition. In this manner, the inventors completed the present disclosure.

Specifically, the present disclosure provides the following.

[1] A resin composition comprising:

(A) 42 mass % to 57 mass % of a polyphenylene ether resin having a reduced viscosity of 0.39 dL/g to 0.43 dL/g as measured in chloroform solvent at 30° C.;

(B) 11 mass % to 26 mass % of a polyphenylene ether resin having a reduced viscosity of 0.31 dL/g to 0.34 dL/g as measured in chloroform solvent at 30° C.;

(C) 9 mass % to 15 mass % of a block copolymer including a vinyl aromatic hydrocarbon polymer block (c1) and a hydrogenated conjugated diene polymer block (c2); and (D) 15 mass % to 23 mass % of a homopolymer of a vinyl aromatic hydrocarbon, wherein the (C) block copolymer includes 62 mass % to 70 mass % of vinyl aromatic hydrocarbon-derived monomer units, has a weight-average molecular weight Mw of 50,000 to 70,000, and has a molecular weight distribution Mw/Mn of 1.00 to 1.30, where Mn is number-average molecular weight.

[2] The resin composition according to [1], wherein the (C) component is a c1-c2-c1 block copolymer formed of polystyrene and hydrogenated polybutadiene.

[3] The resin composition according to [1] or [2], wherein the (D) component is polystyrene having a weight-average molecular weight Mw of 170,000 to 210,000 and a molecular weight distribution Mw/Mn of 2.0 to 3.0.

[4] The resin composition according to any one of [1] to [3], wherein, in a situation in which an injection molding machine equipped with a spiral mold having a width of 8 mm and a shaping thickness of 2 mm is used to shape the resin composition with a cylinder temperature of 330° C., a mold temperature of 120° C., an injection pressure, as a gauge pressure, of 100 MPa, an injection rate of 50 mm/s, and an injection time/cooling time of 9 s/15 s, an obtained shaped article has a flow length L of 400 mm or more from a gate position.

[5] A vehicle lighting fixture bezel formed of the resin composition according to any one of [1] to [4].

[6] The vehicle lighting fixture bezel according to [5], having a specific gravity of 1.10 or less and a water absorption rate of 0.4 mass % or less when allowed to absorb water at 60° C. and 95% RH for 1,000 hours.

[7] The vehicle lighting fixture bezel according to [5] or [6], wherein, in a situation in which the vehicle lighting fixture bezel is left at rest in a 155° C. environment for 24 hours after undergoing aluminum vapor deposition, a change ΔRa of surface roughness Ra of the vehicle lighting fixture bezel between before and after being left is 10 nm or less.

[8] The vehicle lighting fixture bezel according to any one of [5] to [7], having a ratio Lmax/t of maximum flow length Lmax from a gate position and average thickness t of 150 or more.

[9] The vehicle lighting fixture bezel according to any one of [5] to [8], having an average thickness t of 3 mm or less.

According to the present disclosure, it is possible to provide a polyphenylene ether resin composition that has excellent fluidity and heat resistance, and a vehicle lighting fixture bezel that is formed of this resin composition and that has light weight, excellent external appearance, and low water absorbency.

DETAILED DESCRIPTION

The following provides a detailed description of an embodiment of the present disclosure (hereinafter, also referred to as the "present embodiment"). However, the present disclosure is not limited to the following embodiment and may be implemented with various alterations that are within the essential scope thereof.

<Resin Composition>

A resin composition of the present embodiment contains: (A) 42 mass % to 57 mass % of a polyphenylene ether resin having a reduced viscosity of 0.39 dL/g to 0.43 dL/g (in chloroform solvent at 30° C.); (B) 11 mass % to 26 mass % of a polyphenylene ether resin having a reduced viscosity of 0.31 dL/g to 0.34 dL/g (in chloroform solvent at 30° C.); (C) 9 mass % to 15 mass % of a block copolymer including a vinyl aromatic hydrocarbon polymer block (c1) and a hydrogenated conjugated diene polymer block (c2); and (D) 15 mass % to 23 mass % of a homopolymer of a vinyl aromatic hydrocarbon, wherein the (C) block copolymer includes 62 mass % to 70 mass % of vinyl aromatic hydrocarbon-derived monomer units, has a weight-average molecular weight Mw of 50,000 to 70,000, and has a molecular weight distribution Mw/Mn (Mn is number-average molecular weight) of 1.00 to 1.30.

The resin composition of the present embodiment can have excellent fluidity and enables good shaping of a thin-walled shaped article as a result of containing two types of polyphenylene ether resins having different reduced viscosities in a specific ratio. Moreover, through the contents of the polyphenylene ether resins and the homopolymer of a vinyl aromatic hydrocarbon being within specific ranges, it is possible to achieve weight reduction and external appearance enhancement of a shaped article while also maintaining performance of the shaped article necessary for a lighting fixture. Furthermore, through the content of the block copolymer being within a specific range, it is possible to prevent blistering of a shaped article in a hot and humid environment and the occurrence of mold release defects (cracking) during shaping.

The following describes the constituent components of the resin composition of the present embodiment.

<<(A) Polyphenylene Ether Resin>>

The resin composition of the present embodiment contains 42 mass % to 57 mass % of (A) a polyphenylene ether resin having a reduced viscosity (in chloroform at 30° C.) of 0.39 dL/g to 0.43 dL/g (also referred to as the "(A) PPE resin" or simply as the "(A) component" in the present specification) relative to 100 mass % of the resin composition. Through inclusion of the (A) component, the resin composition of the present embodiment has excellent wet heat resistance and a high DTUL, and weight reduction of a shaped article can be achieved.

The (A) polyphenylene ether resin may be a polyphenylene ether, a modified polyphenylene ether, or a mixture of both a polyphenylene ether and a modified polyphenylene ether, for example, without any specific limitations.

One type of (A) component may be used individually, or two or more types of (A) components may be used in combination.

—Polyphenylene Ether—

The polyphenylene ether may be, but is not specifically limited to, a homopolymer formed of a repeating unit structure represented by the following formula (1) and/or a copolymer including a repeating unit structure represented by the following formula (1), for example.

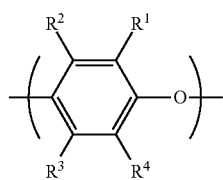

(1)

[In the preceding formula, $R^1$, $R^2$, $R^3$, and $R^4$ are each, independently of one another, a monovalent group selected from the group consisting of a hydrogen atom, a halogen atom, a primary alkyl group including 1 to 7 carbon atoms, a secondary alkyl group including 1 to 7 carbon atoms, a phenyl group, a haloalkyl group, an aminoalkyl group, a hydrocarbon oxy group, and a halohydrocarbon oxy group in which a halogen atom and an oxygen atom are separated by at least two carbon atoms.]

Known polyphenylene ethers can be used as a polyphenylene ether such as described above without any specific limitations. Specific examples of the polyphenylene ether include homopolymers such as poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether); and copolymers such as a copolymer of 2,6-dimethylphenol and another phenol such as 2,3,6-trimethylphenol or 2-methyl-6-butylphenol. Of these polyphenylene ethers, poly(2,6-dimethyl-1,4-phenylene ether) and a copolymer of 2,6-dimethylphenol and 2,3,6-trimethylphenol are preferable, and poly(2,6-dimethyl-1,4-phenylene ether) is more preferable.

Conventional and commonly known methods can be adopted as the production method of the polyphenylene ether without any specific limitations. Specific examples of polyphenylene ether production methods that can be used include a method described in U.S. Pat. No. 3,306,874 A, for example, in which a polyphenylene ether is produced through oxidative polymerization of 2,6-xylenol, for example, using a complex of a cuprous salt and an amine as a catalyst, and methods described in U.S. Pat. Nos. 3,306,875 A, 3,257,357 A, 3,257,358 A, JP S52-17880 B, JP S50-51197 A, and JP S63-152628 A.

—Modified Polyphenylene Ether—

The modified polyphenylene ether may be, but is not specifically limited to, a modified polyphenylene ether obtained through grafting and/or addition of a styrenic polymer and/or derivative thereof to the polyphenylene ether described above. The percentage increase in mass due to grafting and/or addition is not specifically limited, but relative to 100 mass % of the modified polyphenylene ether, is preferably 0.01 mass % or more, and is preferably 10 mass % or less, more preferably 7 mass % or less, and particularly preferably 5 mass % or less.

The method by which the modified polyphenylene ether is produced is not specifically limited and may, for example, be a method in which grafting and/or addition of any of various vinyl compounds is carried out in the presence or absence of a radical precursor. A method in which the polyphenylene ether described above and a styrenic polymer and/or derivative thereof are caused to react in a molten state, solution state, or slurry state under conditions of 80° C. to 350° C., or the like, is preferable.

In a case in which the (A) component is a mixture of a polyphenylene ether and a modified polyphenylene ether, the mixing proportions of the polyphenylene ether and the modified polyphenylene ether may be any proportions without any specific limitations.

The reduced viscosity of the (A) component is 0.39 dL/g to 0.43 dL/g, preferably 0.39 dL/g to 0.42 dL/g, and more preferably 0.40 dL/g to 0.42 dL/g from a viewpoint of fluidity of the resin composition and strength of an obtained shaped article. The reduced viscosity can be controlled through the polymerization time and the amount of catalyst.

Note that the reduced viscosity of the (A) component can be measured as $\eta_{sp/c\ of\ a}$ 0.5 g/dL chloroform solution at a temperature of 30° C. using an Ubbelohde viscometer.

The content of the (A) component in the resin composition of the present embodiment relative to the total amount (100 mass %) of the resin composition is 42 mass % to 57 mass %, preferably 48 mass % to 56 mass %, and more preferably 50 mass % to 56 mass % from a viewpoint of fluidity of the resin composition, and strength and light weight of an obtained shaped article.

<<(B) Polyphenylene Ether Resin>>

The resin composition of the present embodiment contains 11 mass % to 26 mass % of (B) a polyphenylene ether resin having a reduced viscosity (in chloroform at 30° C.) of 0.31 dL/g to 0.34 dL/g (also referred to as the "(B) PPE resin" or simply as the "(B) component" in the present specification) relative to 100 mass % of the resin composition. Through inclusion of the (B) component, the resin composition of the present embodiment has excellent wet heat resistance, excellent shaping fluidity, and a high DTUL, and weight reduction of a shaped article can be achieved.

The (B) polyphenylene ether resin used in the present embodiment may, without any specific limitations, be any of the same polyphenylene ether resins as for the (A) polyphenylene ether resin described above.

The reduced viscosity of the (B) component is 0.31 dL/g to 0.34 dL/g, and preferably 0.32 dL/g to 0.33 dL/g from a viewpoint of fluidity of the resin composition and strength of an obtained shaped article. The reduced viscosity can be controlled through the polymerization time and the amount of catalyst.

Note that the reduced viscosity of the (B) component can be measured as $\eta_{sp/c}$ of a 0.5 g/dL chloroform solution at a temperature of 30° C. using an Ubbelohde viscometer.

The content of the (B) component in the resin composition of the present embodiment relative to the total amount (100 mass %) of the resin composition is 11 mass % to 26 mass %, preferably 12 mass % to 20 mass %, and more preferably 12 mass % to 18 mass % from a viewpoint of fluidity of the resin composition, and strength and light weight of an obtained shaped article.

<<(C) Block Copolymer>>

The resin composition of the present embodiment contains 9 mass % to 15 mass % of (C) a block copolymer including a vinyl aromatic hydrocarbon polymer block (c1) and a hydrogenated conjugated diene polymer block (c2) (also referred to simply as the "(C) component" in the present specification) relative to 100 mass % of the resin composition. Through inclusion of the (C) component in the resin composition of the present embodiment, miscibility of the (A) component and the (B) component and impact resistance are improved.

An unmodified block copolymer, a modified block copolymer, or a mixture of an unmodified block copolymer and a modified block copolymer may, for example, be used as the (C) block copolymer without any specific limitations. One type of (C) component may be used individually, or two or more types of (C) components may be used in combination.

Note that the (C) component may include a block other than the vinyl aromatic hydrocarbon polymer block (c1) and the hydrogenated conjugated diene polymer block (c2) in a small amount that does not interfere with the objectives herein.

—Vinyl aromatic hydrocarbon polymer block (c1)—

A vinyl aromatic hydrocarbon compound forming the vinyl aromatic hydrocarbon polymer block (c1) is not specifically limited and may, for example, be styrene, α-methylstyrene, vinyltoluene, p-tert-butylstyrene, diphenylethylene, or the like, with styrene, in particular, being preferable. One of the vinyl aromatic hydrocarbon compounds described above may be used individually, or two or more of the vinyl aromatic hydrocarbon compounds described above may be used in combination.

The content of the vinyl aromatic hydrocarbon polymer block (c1) (i.e., the content of vinyl aromatic hydrocarbon-derived monomer units) in the (C) block copolymer is 62 mass % to 70 mass %, preferably 64 mass % to 70 mass %, and more preferably 64 mass % to 68 mass % from a viewpoint of miscibility of the (A) component and the (B) component.

—Hydrogenated Conjugated Diene Polymer Block (c2)—

The hydrogenation rate of the hydrogenated conjugated diene polymer block (c2) is preferably 50% or more, more preferably 80% or more, and even more preferably 95% or more from a viewpoint of thermal stability.

The hydrogenation rate can be measured using a nuclear magnetic resonance (NMR) spectrometer.

A conjugated diene compound forming the conjugated diene polymer block (c2) is not specifically limited and may, for example, be butadiene, isoprene, 1,3-pentadiene, 2,3-dimethyl-1,3-butadiene, a combination thereof, or the like, with butadiene being particularly preferable. One of the conjugated diene compounds described above may be used individually, or two or more of the conjugated diene compounds described above may be used in combination.

The content of the hydrogenated conjugated diene polymer block (c2) in the (C) block copolymer is preferably 30 mass % to 38 mass %, more preferably 30 mass % to 36 mass %, and even more preferably 32 mass % to 36 mass % from a viewpoint of mechanical strength.

The arrangement of repeating units forming the (C) block copolymer may be a linear arrangement or a radial arrangement, and is preferably a linear arrangement. More specifically, the structure of the above-described vinyl aromatic hydrocarbon polymer block (e1) and conjugated diene polymer block (c2) in the (C) block copolymer may be c1-c2, c1-c2-c1, c2-c1-c2-c1, or the like. Of these examples, a c1-c2-c1 block copolymer formed of a polystyrene-hydrogenated polybutadiene-polystyrene structure is particularly preferable from a viewpoint of preventing blistering in hot and humid environments.

The weight-average molecular weight Mw of the (C) component is 50,000 to 70,000, preferably 51,000 to 70,000, and more preferably 51,000 to 68,000 from a viewpoint of shaping fluidity of the resin composition, preservation of external appearance of an obtained shaped article, and miscibility of the (A) component and the (B) component.

Moreover, the molecular weight distribution Mw/Mn (Mn is number-average molecular weight) of the (C) component is 1.00 to 1.30, preferably 1.05 to 1.20, and more preferably 1.05 to 1.15 from a viewpoint of shaping fluidity.

Note that the weight-average molecular weight Mw, number-average molecular weight Mn, and molecular weight distribution Mw/Mn of the (C) component can be determined by a conventional and commonly known method as polystyrene-equivalent molecular weights measured by GPC (gel permeation chromatography) with chloroform as a mobile phase.

The content of the (C) component in the resin composition of the present embodiment relative to the total amount (100 mass %) of the resin composition is 9 mass % to 15 mass %, preferably 9 mass % to 13 mass %, and more preferably 10 mass % to 13 mass % from a viewpoint of preventing blistering of an obtained shaped article in hot and humid environments, mold release defects (cracking) during production of a shaped article, and so forth.

The method by which the (C) block copolymer is produced is not specifically limited and may be a commonly known method. Specific examples of commonly known production methods that can be used include those described in JP S47-11486 A, JP S49-66743 A, JP S50-75651 A, JP S54-126255 A, JP S56-10542 A, JP S56-62847 A, JP S56-100840 A, JP H02-300218 A, GB 1130770 A, U.S. Pat. Nos. 3,281,383 A, 3,639,517 A, GB 1020720 A, U.S. Pat. Nos. 3,333,024 A, and 4,501,857 A.

<<(D) Homopolymer of Vinyl Aromatic Hydrocarbon>>

The resin composition of the present embodiment contains 15 mass % to 23 mass % of (D) a homopolymer of a vinyl aromatic hydrocarbon (also referred to simply as the "(D) component" in the present specification) relative to 100 mass % of the resin composition. Through inclusion of the (D) component in the resin composition of the present embodiment, fluidity is promoted, and heat resistance is appropriately adjusted.

A vinyl aromatic hydrocarbon compound forming the (D) component is not specifically limited and may, for example, be styrene, α-methylstyrene, vinyltoluene, p-tert-butylstyrene, diphenylethylene, or the like, with styrene, in particular, being preferable.

The weight-average molecular weight Mw of the (D) component is preferably 170,000 to 210,000, more preferably 180,000 to 210,000, and even more preferably 185,000 to 210,000. A high-strength shaped article can be obtained through the weight-average molecular weight Mw being 170,000 or more, whereas the resin composition has better viscosity and the occurrence of a short shot in injection molding of a shaped article can be prevented through the weight-average molecular weight Mw being 210,000 or less.

The molecular weight distribution Mw/Mn (Mn is number-average molecular weight) of the (D) component is preferably 2.0 to 3.0, and more preferably 2.2 to 2.8 from a viewpoint of shaping fluidity.

Note that the weight-average molecular weight Mw, number-average molecular weight Mn, and molecular weight distribution Mw/Mn of the (D) component can be determined by a conventional and commonly known method as polystyrene-equivalent molecular weights measured by GPC (gel permeation chromatography) with chloroform as a mobile phase.

The content of the (D) component in the resin composition of the present embodiment relative to the total amount (100 mass %) of the resin composition is 15 mass % to 23 mass %, and preferably 15 mass % to 22 mass % from a viewpoint of heat resistance of an obtained shaped article and shaping fluidity of the resin composition.

<<(E) Other Additives>>

Examples of (E) other additives that can optionally be used in the present embodiment include, but are not specifically limited to, vinyl aromatic hydrocarbon polymer-conjugated diene polymer block copolymers other than the (C) component, antioxidants, metal deactivators, heat stabilizers, flame retardants, fluorine-based polymers, plasticizers, flame retardant synergists such as antimony trioxide, weather (light) resistance enhancers, slip agents, various colorants such as carbon black, release agents, and compatibilizers.

In particular, carbon black having an average primary particle diameter of 8 nm to 50 nm is preferable, carbon black having an average primary particle diameter of 10 nm to 40 nm is more preferable, and carbon black having an average primary particle diameter of 10 nm to 30 nm is even more preferable as carbon black. An average primary particle diameter of 8 nm or more is preferable from a viewpoint of fluidity of the resin composition. Moreover, an average primary particle diameter of 50 nm or less is preferable for avoiding external appearance defects caused by carbon having a large particle diameter protruding at the surface.

The content of carbon black in the resin composition relative to the total amount (100 mass %) of the resin composition is preferably 0.05 mass % to 2.0 mass %, and more preferably 0.05 mass % to 1.0 mass % from a viewpoint of enhancing the external appearance of an obtained shaped article.

The content of each other additive in the resin composition of the present embodiment is preferably 1.0 mass % or less relative to the total amount (100 mass %) of the resin composition from a viewpoint of long-term aging characteristics of an obtained shaped article and enhancing the external appearance of the shaped article. Moreover, the total amount of other additives relative to the total amount (100 mass %) of the resin composition is preferably 5.0 mass % or less, more preferably 3.0 mass % or less, and may be 2.0 mass % or less.

The shaping fluidity of the resin composition of the present embodiment can be evaluated through the flow length L (mm) of an obtained shaped article from a gate position (position corresponding to a gate of a mold) in a situation in which an injection molding machine (for example, an EC-40N produced by Toshiba Machine Co., Ltd.) equipped with a spiral mold having a width of 8 mm, a shaping thickness of 2 mm, and a length of 500 mm is used to shape the resin composition with a cylinder temperature of 330° C., a mold temperature of 120° C., an injection pressure of 100 MPa (gauge pressure), an injection rate of 50 mm/s, and an injection time/cooling time of 9 s/15 s.

The flow length L is preferably 400 mm or more, more preferably 420 mm or more, and even more preferably 430 mm or more. When the flow length L is within any of the ranges set forth above, it is easy to produce a thin-walled shaped article having excellent external appearance through injection molding with a small number of gate points.

Note that the flow length L (mm) is taken to be an average value of values measured for 10 shaped articles, and can, more specifically, be determined by a method described in the subsequent EXAMPLES section.

<Production method of resin composition>

The resin composition of the present embodiment can be produced by melt-kneading raw materials such as the (A) and (B) polyphenylene ether resins, the (C) block copolymer, the (D) homopolymer of a vinyl aromatic hydrocarbon, and the (E) other materials that are optional components in the same manner as in melt-kneading in a production method of the (A) polyphenylene ether. Although no specific limitations are placed on the conditions under which the (A) to (E) components and so forth are melt-kneaded to produce the resin composition, the use of a twin screw extruder having a screw diameter of 25 mm to 90 mm is appropriate from a viewpoint of enabling stable production of a large amount of a resin composition that can sufficiently display the desired effects of the present embodiment. As one example, in a case in which a TEM58SS twin screw extruder (produced by Toshiba Machine Co., Ltd.; number of barrels: 13; screw diameter: 58 mm; L/D=53; screw pattern including 2 kneading discs L, 14 kneading discs R, and 2 kneading discs N) is used, melt-kneading may be carried out under conditions of a cylinder temperature of 270° C. to 330° C., a screw speed of 150 rpm to 700 rpm, an extrusion rate of 150 kg/h to 600 kg/h, and a vent degree of vacuum of 11.0 kPa to 1.0 kPa.

This melt-kneading is preferably performed with an extruded resin temperature within a range of 250° C. to 380° C. The extruded resin temperature is more preferably within a range of 270° C. to 360° C., and even more preferably within a range of 300° C. to 350° C. An extruded resin temperature of 250° C. or higher is preferable from a viewpoint of extrudability and sufficient expression of effects required in the uses disclosed herein, whereas an extruded resin temperature of 380° C. or lower is preferable from a viewpoint of extrudability and preventing decomposition of the resin composition.

In a case in which the resin composition used in the present embodiment is produced using a large-scale (screw diameter: 40 mm to 90 mm) twin screw extruder, it is important to be aware that gel and carbides arising from the (A) component during extrusion may become mixed into extruded resin pellets, and this may cause deterioration of surface appearance of a shaped article and reduction of surface reflectance of a laminated shaped article. Therefore, it is preferable that the (A) component is fed from a furthest upstream raw material feeding inlet (top feed) and that the oxygen concentration inside of a chute of the further upstream feeding inlet is set as 15 vol. % or less, more preferably 8 vol. % or less, and even more preferably 1 vol. % or less.

Note that adjustment of the oxygen concentration can be performed by, after sufficiently purging the inside of a raw material storage hopper with nitrogen and tightly sealing a feed line from the raw material storage hopper to the raw material feeding inlet of the extruder such that air does not enter or exit the feed line, adjusting the nitrogen feed rate and the aperture of a gas vent.

<Shaped Article>

A shaped article of the present embodiment can be obtained through shaping of the resin composition set forth above.

Examples of applications for the shaped article of the present embodiment include, but are not specifically limited to, a light source reflecting component of a projector, various types of lighting equipment, or the like, a lamp reflector for an automobile, and a vehicle lighting fixture bezel obtained through vapor deposition of aluminum onto the surface of the shaped article as a base. Of these examples, the shaped article of the present embodiment is preferably used as a vehicle lighting fixture reflector or a vehicle lighting fixture bezel, and, in particular, is preferably used as a vehicle lighting fixture bezel.

Note that a vehicle lighting fixture bezel is a comparatively large light-reflecting component that is present between a reflector, which is a light-reflecting component located backward of a light source beam of an automobile headlight, and a lamp front cover. Although a vehicle lighting fixture bezel is not required to have heat resistance as high as that of a reflector, it is necessary for a vehicle lighting fixture bezel to have good brightness of a shaped article glossy surface and surface appearance after aluminum vapor deposition, an adequate balance of heat resistance and shaping fluidity, light weight (i.e., be a material having a low specific gravity), and so forth to even higher levels.

The specific gravity of the shaped article of the present embodiment is preferably 1.15 or less, more preferably 1.00 to 1.15, and even more preferably 1.00 to 1.10 from a viewpoint of light weight.

Note that the specific gravity of the shaped article can, more specifically, be measured by a method described in the subsequent EXAMPLES section.

The rate of water absorption by the shaped article of the present embodiment when the shaped article is allowed to absorb water at 60° C. and 95% RH for 1,000 hours is preferably 0.4 mass % or less, more preferably 0.35 mass % or less, and even more preferably 0.30 mass % or less from a viewpoint of preventing condensation. The lower limit for the rate of water absorption is not specifically limited and can be 0 mass % or more.

Note that the rate of water absorption by the shaped article can, more specifically, be measured by a method described in the subsequent EXAMPLES section.

The change (ΔRa) of surface roughness Ra of the shaped article of the present embodiment between before and after the shaped article is left at rest in a 155° C. environment for 24 hours is preferably 10 nm or less, more preferably 8 nm or less, and even more preferably 5 nm or less from a viewpoint of preserving good external appearance even after aluminum vapor deposition.

Note that the change (ΔRa) of surface roughness Ra of the shaped article can, more specifically, be observed by a method described in the subsequent EXAMPLES section.

The shaped article of the present embodiment preferably has a thin-walled shape from a viewpoint of responding to applications such as for a vehicle lighting fixture bezel and a vehicle lighting fixture reflector.

A ratio Lmax/t of the maximum flow length Lmax of a shaped article from a gate position (position corresponding to a gate of a mold) and the average thickness t of the shaped article may, for example, be used as an indicator for evaluation of thin-walled shape. Lmax/t of the shaped article is preferably 150 or more, more preferably 155 or more, and even more preferably 160 or more.

Note that the maximum flow length Lmax and the average thickness t can, more specifically, be observed by a method described in the subsequent EXAMPLES section.

The average thickness t of a vehicle lighting fixture bezel of the present embodiment is preferably 3.0 mm or less, more preferably 2.4 mm or less, even more preferably 1.8 mm or less, and particularly preferably 1.5 mm or less from a viewpoint of light weight.

Note that the average thickness t can, more specifically, be observed by a method described in the subsequent EXAMPLES section.

<Production Method of Shaped Article>

Examples of suitable methods by which the shaped article of the present embodiment can be produced include, but are not specifically limited to, injection molding, extrusion molding, vacuum forming, and pressure forming, with injection molding, in particular, being more suitable from a viewpoint of shaping external appearance and brightness.

The shaping temperature during production of the shaped article is preferably within a range of a maximum barrel temperature setting of 250° C. to 340° C., more preferably 270° C. to 330° C., and even more preferably 280° C. to 320° C. A shaping temperature of 250° C. or higher is preferable from a viewpoint of sufficient shaping processability, whereas a shaping temperature of 340° C. or lower is preferable from a viewpoint of inhibiting thermal degradation of resin.

The mold temperature during production of the shaped article is preferably within a range of 40° C. to 170° C., more preferably 80° C. to 150° C., and even more preferably 80° C. to 130° C. A mold temperature of 40° C. or higher is preferable from a viewpoint of preserving adequate external appearance of the shaped article, whereas a mold temperature of 170° C. or lower is preferable from a viewpoint of shaping stability.

EXAMPLES

The following describes embodiments of the present disclosure through examples. However, the present disclosure is not limited to these examples.

Raw materials used for resin compositions and shaped articles in the examples and comparative examples were as follows.

[Raw Materials]

(A) Polyphenylene Ether Resin

Polyphenylene ether having a reduced viscosity of 0.41 dL/g obtained through oxidative polymerization of 2,6-xylenol (B) Polyphenylene Ether Resin Polyphenylene ether having a reduced viscosity of 0.31 dL/g obtained in the same way as the (A) polyphenylene ether resin Note that the reduced viscosity ($\eta_{sp}/c$) of each of the (A) and (B) polyphenylene ethers was measured by an Ubbelohde viscometer at 30° C. using a 0.5 g/dL chloroform solution of the polyphenylene ether.

(C) Block Copolymer

Unmodified block copolymers each including a vinyl aromatic hydrocarbon polymer block (c1) formed of polystyrene and a hydrogenated conjugated diene polymer block (c2) formed of hydrogenated polybutadiene were synthesized. The physical properties of the obtained block copolymers were as follows.

SEBS (C)-1 c1-c2-c1 Type hydrogenated block copolymer having a weight-average molecular weight Mw of 52,000, a molecular weight distribution Mw/Mn of 1.09, and a bound styrene content of 65 mass %, and including polystyrene blocks and a hydrogenated butadiene block having a hydrogenation rate of 98%

SEBS (C)-2 c1-c2-c1 Type hydrogenated block copolymer having a weight-average molecular weight Mw of 72,000, a molecular weight distribution Mw/Mn of 1.10, and a bound styrene content of 32 mass %, and including polystyrene blocks and a hydrogenated butadiene block having a hydrogenation rate of 98%

(D) Homopolymer of Vinyl Aromatic Hydrocarbon

General purpose polystyrene (GPPS) having a weight-average molecular weight Mw of 200,000 and a molecular weight distribution Mw/Mn of 2.4

Note that the weight-average molecular weight (Mw) and the molecular weight distribution Mw/Mn of each (C) block copolymer and (D) homopolymer of a vinyl aromatic hydrocarbon were determined under the following conditions.

Apparatus: TOSOH EcoSEC HLC-8320GPC
Column: Shodex K-806H, Shodex K-803L
Solvent: Chloroform
Flow rate: 1.0 mL/min
Column temperature: 35° C.
Detector: UV (254 nm), RI (30° C.)
Sample concentration: 0.1 w/v %

A calibration curve for calculation of the weight-average molecular weight Mw and the molecular weight distribution Mw/Mn was prepared using polystyrene.

(E) Other Additives
Carbon Black (CB)

Carbon having a primary particle diameter of 15 nm was used, and this carbon and the previously described GPPS were melt-kneaded to obtain a masterbatch (MB).

Note that the carbon concentration was 45 mass % relative to 100 mass %, in total, of the carbon and the GPPS.

Other Raw Materials

Polycarbonate (PC) (product name: Panlite® L-1225L (Panlite is a registered trademark in Japan, other countries, or both); produced by Teijin Limited)

Polybutylene terephthalate (PBT)/polyethylene terephthalate (PET) (PBT/PET) (product name: VALOX® EH7020HF (VALOX is a registered trademark in Japan, other countries, or both); produced by SABIC)

[Measurement Methods of Physical Properties]

1. Specific Gravity

The specific gravity of each resin composition (Examples 1 to 5 and Comparative Examples 1 to 6), PC (Comparative Example 7), and PET/PBT (Comparative Example 8) at 23° C. was measured in accordance with ISO 1183.

2. Deflection temperature under load (DTUL)

Pellets of an obtained resin composition (Examples 1 to 5 and Comparative Examples 1 to 6) were dried in a hot-air dryer at 120° C. for 3 hours.

An injection molding machine (IS-80EPN produced by Toshiba Machine Co., Ltd.) equipped with an ISO physical property test specimen mold was used to shape a dumbbell shaped piece that was an ISO 3167 A-type multipurpose test specimen from the dried resin composition with a cylinder temperature of 330° C., a mold temperature of 120° C., an injection pressure of 50 MPa (gauge pressure), an injection rate of 200 mm/s, and an injection time/cooling time of 20 s/20 s.

A test specimen of 80 mm×10 mm×4 mm was prepared by cutting the obtained shaped piece, and this test specimen was used to measure the deflection temperature under load (DTUL) at 0.45 MPa by the flatwise method.

A higher value was judged to indicate better heat resistance.

3. Water Absorbency

Pellets of an obtained resin composition (Examples 1 to 5 and Comparative Examples 1 to 6) were dried in a hot-air dryer at 120° C. for 3 hours.

An injection molding machine (IS-80EPN produced by Toshiba Machine Co., Ltd.) equipped with an ISO physical property test specimen mold was used to shape a dumbbell shaped piece that was an ISO 3167 A-type multipurpose test specimen from the dried resin composition with a cylinder temperature of 330° C., a mold temperature of 120° C., an injection pressure of 50 MPa (gauge pressure), an injection rate of 200 mm/s, and an injection time/cooling time of 20 s/20 s.

A test specimen of 80 mm×10 mm×4 mm was prepared by cutting the obtained shaped piece.

Note that a test specimen of polycarbonate (Comparative Example 7) was prepared in the same way as a test specimen of a resin composition with the exception that pellets that had been dried in a hot-air dryer at 120° C. for 5 hours were used, and the cylinder temperature was set as 320° C. and the mold temperature was set as 80° C. in the injection molding machine.

A test specimen of PET/PBT (Comparative Example 8) was prepared in the same way as a test specimen of a resin composition with the exception that pellets that had been dried in a hot-air dryer at 120° C. for 5 hours were used, and the cylinder temperature was set as 280° C. and the mold temperature was set as 80° C. in the injection molding machine.

Each test specimen was dried in a hot-air dryer at 120° C. for 5 hours. Each test specimen was then restored to room temperature and the weight of the test specimen after this initial drying was taken to be (i).

The test specimen was placed inside a beaker, and was then placed inside a constant-humidity and constant-temperature tank that had been adjusted to 60° C. and 95% humidity and was left at rest for 1,000 hours. The test specimen was removed and was lightly blown with compressed air. The weight of the test specimen after this blowing was taken to be (ii). The rate of water absorption was calculated as: rate of water absorption=(i)−(i)/(i).

4. Shapeability

Pellets of an obtained resin composition (Examples 1 to 5 and Comparative Examples 1 to 6) were dried in a hot-air dryer at 120° C. for 3 hours. Thereafter, an injection molding machine (produced by Toshiba Machine Co., Ltd.; 40 t) equipped with a 60 mm×60 mm×2 mm (thickness) mold having a mold surface that had been polished by #8000 was used to shape the pellets with a cylinder temperature of 330° C., a mold temperature of 120° C., an injection pressure of 100 MPa (gauge pressure), an injection rate of 50 mm/s, and an injection time/cooling time of 0.25 s/20 s to obtain a shaped article.

An evaluation of "good" was given in a case in which good shaping was possible and an evaluation of "poor" was given in a case in which a short shot occurred or in which surface peeling, cracking, or the like occurred during mold release.

5. Shaping Fluidity (flow length L)

An injection molding machine (EC-40N produced by Toshiba Machine Co., Ltd.; 40 t) equipped with a spiral mold of 8 mm in width, 2 mm in shaping thickness, and 500 mm in length that had a mold surface polished by #8000 was used to shape pellets of an obtained resin composition (Examples 1 to 5 and Comparative Examples 1 to 6) with a cylinder temperature of 330° C., a mold temperature of 120° C., an injection pressure of 100 MPa (gauge pressure), an injection rate of 50 mm/s, and an injection time/cooling time of 9 s/15 s to produce 10 shaped articles. The flow length of each shaped article from a gate position was measured, and the measured values were averaged to determine the flow length L (mm).

6. External Appearance of Shaped Article after Water Absorption+ Thermal Aging

The initial external appearance of a shaped article obtained in "4. Shapeability" (Examples 1 to 5 and Comparative Examples 1 to 6) was observed.

Thereafter, the shaped article was placed in a constant-humidity and constant-temperature tank that had been adjusted to 60° C. and 95% humidity and was left at rest for 24 hours. The shaped article was then left at rest in a hot-air dryer at 155° C. for 24 hours, and the external appearance of the shaped article was visually evaluated.

An evaluation of "good" was given in a case in which the external appearance of the shaped article was similar to its initial external appearance and an evaluation of "poor" was given in a case in which blistering of the shaped article had occurred compared to its initial external appearance.

7. External Appearance of Vapor Deposition-Treated Shaped Article After Thermal Aging A shaped article obtained in "4. Shapeability" (Examples 1 to 5 and Comparative Examples 1 to 6) was subjected to aluminum vapor deposition to produce a vapor deposition-treated shaped article. The method of aluminum vapor deposition was as follows.

An inert gas and oxygen were introduced into a vapor deposition apparatus under vacuum conditions, the inside of a chamber of the apparatus was placed in a plasma state, plasma treatment was performed to activate the surface of the shaped article, and then aluminum vapor deposition was performed with respect to the shaped article inside the vapor deposition apparatus under vacuum to obtain a vapor deposition-treated shaped article. The thickness of the aluminum film was approximately 20 nm.

The obtained vapor deposition-treated shaped article was left at rest in an oven adjusted to 155° C. for 24 hours.

Thereafter, the vapor deposition-treated shaped article was restored to room temperature and was removed from the apparatus, and then the external appearance of the vapor deposition-treated shaped article was visually observed.

An evaluation of "good" was given in a case in which there were no problems with the external appearance of the vapor deposition-treated shaped article, and an evaluation of "poor" was given in a case in which rainbow coloring of the vapor deposition-treated surface was observed or a case in which deformation of the vapor deposition layer due to blistering of the shaped article was observed.

8. Change ($\Delta Ra$) of surface roughness of vapor deposition-treated shaped article between before and after thermal aging The change ($\Delta Ra$) (nm) of surface roughness between before and after thermal aging was measured with respect to a vapor deposition-treated shaped article produced in "7. External appearance of vapor deposition-treated shaped article after thermal aging".

The surface roughness Ra1 of the vapor deposition-treated shaped article before thermal aging was measured at three locations using a surface profilometer (DEKTAK 60M produced by ULVAC, Inc.).

Thereafter, the vapor deposition-treated shaped article was left at rest in an oven adjusted to 155° C. for 24 hours.

The surface roughness Ra2 of the vapor deposition-treated shaped article after thermal aging was measured at the same measurement locations as before thermal aging, the change ($\Delta Ra = Ra2 - Ra1$) of surface roughness Ra was calculated, and an average value of the calculated values was determined.

[Examples and Comparative Examples]

The following describes each example and comparative example.

Examples 1 to 5 and Comparative Examples 1 to 8

A twin screw extruder (TEM58SS produced by Toshiba Machine Co., Ltd.) was used as a melt-kneader in production of a resin composition in each example and comparative example. The number of barrels was 13, the screw diameter was 58 mm, and L/D was 53.

The (A) polyphenylene ether resin, (B) polyphenylene ether resin, (C) block copolymer, (D) homopolymer of a vinyl aromatic hydrocarbon, and (E) other additives (carbon masterbatch) were each fed from a furthest upstream section (top feed) of the twin screw extruder in a make-up shown in Table 1 and were melt-kneaded under conditions of a cylinder temperature of 300° C., a screw speed of 450 rpm, an extrusion rate of 400 kg/h, a vent degree of vacuum of 79.98 kPa (600 Torr) to obtain a resin composition.

Various physical properties of obtained resin compositions and shaped articles are shown in Table 1.

Example 6

An injection molding machine (produced by Toshiba Machine Co., Ltd.; 650 t) was used to shape a vehicle lighting fixture bezel having an average thickness t of 1.8 mm and a ratio Lmax/t of maximum flow length Lmax from a gate position and average thickness t of 160 from the composition of Example 1. Good shaping was possible when the shaping conditions were set as a cylinder temperature of 330° C., a mold temperature of 120° C., an injection pressure of 150 MPa (gauge pressure), an injection rate of 50 mm/s, and an injection time/cooling time of 2 s/60 s.

Note that the maximum flow length Lmax is a value that was obtained by identifying a resin flow section furthest from the gate position as the flow front through observation of the appearance of the resin flow by a microscope, and then measuring the length from the gate position to the flow front in the direction of flow. Moreover, the average thickness t is an average value of thicknesses measured at 5 points from the gate to the maximum flow length end.

The evaluations 6 to 8 were performed with the obtained shaped article as an evaluation sample. Blistering did not occur after thermal aging following water absorption, external appearance after thermal aging following vapor deposition was good, and the change (ΔRa) of surface roughness between before and after thermal aging was 5 nm.

TABLE 1

|  |  |  |  | Example 1 | Example 2 | Example 3 | Example 4 | Example 5 | Comparative Example 1 | Comparative Example 2 |
|---|---|---|---|---|---|---|---|---|---|---|
| Raw material make-up |  | PPE (A) | Parts by mass | 54 | 51 | 57 | 54 | 42 | 68 | 49 |
|  |  | PPE (B) | Parts by mass | 14 | 11 | 11 | 14 | 26 | 0 | 11 |
|  |  | SEBS (C)-1 | Parts by mass | 12 | 15 | 9 | 12.5 | 12 | 12 | 15 |
|  |  | SEBS (C)-2 | Parts by mass |  |  |  |  |  |  |  |
|  |  | GPPS (D) | Parts by mass | 18 | 21 | 15 | 19 | 18 | 18 | 23 |
|  |  | MB | Parts by mass | 2 | 2 | 2 | 0.5 | 2 | 2 | 2 |
|  |  | (CB in MB) |  | (0.9) | (0.9) | (0.9) | (0.225) | (0.9) | (0.9) | (0.9) |
|  |  | (GPPS (D) in MB) |  | (1.1) | (1.1) | (1.1) | (0.275) | (1.1) | (1.1) | (1.1) |
|  |  | PC | Parts by mass |  |  |  |  |  |  |  |
|  |  | PBT/PET | Parts by mass |  |  |  |  |  |  |  |
| Physical properties | Composition | Specific gravity | — | 1.06 | 1.06 | 1.06 | 1.06 | 1.06 | 1.06 | 1.06 |
|  |  | Shapeability | — | Good | Good | Good | Good | Good | Poor | Good |
|  |  | Flow length L | mm | 520 | 552 | 486 | 510 | 526 | 420 | 620 |
|  | Shaped article | Rate of water absorption | Mass % | 0.12 | 0.12 | 0.12 | 0.12 | 0.12 | 0.12 | 0.12 |
|  |  | DTUL | ° C. | 157 | 154 | 162 | 157 | 157 | 157 | 150 |
|  |  | External appearance after water absorption (60° C., 95% humidity, 24 h) + thermal aging (155° C., 24 h) | — | Good | Good | Good | Good | Good | Good | Good |
|  | Vapor deposition-treated article | External appearance after thermal aging (155° C., 24 h) | — | Good | Good | Good | Good | Good | Good | Poor |
|  |  | Change (ΔRa) of surface roughness between before and after thermal aging | nm | 5 | 9 | 3 | 5 | 5 | 4 | 100 |

|  |  |  |  | Comparative Example 3 | Comparative Example 4 | Comparative Example 5 | Comparative Example 6 | Comparative Example 7 | Comparative Example 8 |
|---|---|---|---|---|---|---|---|---|---|
| Raw material make-up |  | PPE (A) | Parts by mass | 51 | 54 | 59 | 59 |  |  |
|  |  | PPE (B) | Parts by mass | 11 | 14 | 18 | 18 |  |  |
|  |  | SEBS (C)-1 | Parts by mass | 18 |  | 5 | 15 |  |  |
|  |  | SEBS (C)-2 | Parts by mass |  | 12 |  |  |  |  |
|  |  | GPPS (D) | Parts by mass | 18 | 18 | 16 | 6 |  |  |
|  |  | MB | Parts by mass | 2 | 2 | 2 | 2 |  |  |
|  |  | (CB in MB) |  | (0.9) | (0.9) | (0.9) | (0.9) |  |  |
|  |  | (GPPS (D) in MB) |  | (1.1) | (1.1) | (1.1) | (1.1) |  |  |
|  |  | PC | Parts by mass |  |  |  |  | 100 |  |
|  |  | PBT/PET | Parts by mass |  |  |  |  |  | 100 |
| Physical properties | Composition | Specific gravity | — | 1.06 | 1.06 | 1.06 | 1.06 | 1.20 | 1.49 |
|  |  | Shapeability | — | Good | Good | Poor | Poor | Poor | Good |
|  |  | Flow length L | mm | 542 | 496 | 416 | 430 | 360 | 500 |
|  | Shaped article | Rate of water absorption | Mass % | 0.12 | 0.12 | 0.12 | 0.12 | 0.70 | 0.80 |
|  |  | DTUL | ° C. | 152 | 157 | 165 | 166 | — | — |
|  |  | External appearance after water absorption (60° C., 95% humidity, 24 h) + thermal aging (155° C., 24 h) | — | Poor | Poor | Good | Good | — | — |
|  | Vapor deposition-treated article | External appearance after thermal aging (155° C., 24 h) | — | Poor | Good | Good | Good | — | — |
|  |  | Change (ΔRa) of surface roughness between before and after thermal aging | nm | 20 | 5 | 3 | 3 | — | — |

INDUSTRIAL APPLICABILITY

The disclosed resin composition has excellent fluidity and heat resistance, and a vehicle lighting fixture bezel formed of the resin composition has light weight, excellent external appearance, and low water absorbency, and thus can contribute to weight reduction, external appearance enhancement, and durability enhancement of a vehicle such as an automobile.

The invention claimed is:

1. A resin composition comprising:
   (A) 42 mass % to 57 mass % of a polyphenylene ether resin having a reduced viscosity of 0.39 dL/g to 0.43 dL/g as measured in chloroform solvent at 30° C.;
   (B) 11 mass % to 26 mass % of a polyphenylene ether resin having a reduced viscosity of 0.31 dL/g to 0.34 dL/g as measured in chloroform solvent at 30° C.;
   (C) 9 mass % to 15 mass % of a block copolymer including a vinyl aromatic hydrocarbon polymer block (c1) and a hydrogenated conjugated diene polymer block (c2); and
   (D) 15 mass % to 23 mass % of a homopolymer of a vinyl aromatic hydrocarbon, wherein
   the (C) block copolymer includes 62 mass % to 70 mass % of vinyl aromatic hydrocarbon-derived monomer units, has a weight-average molecular weight Mw of 50,000 to 70,000, and has a molecular weight distribution Mw/Mn of 1.00 to 1.30, where Mn is number-average molecular weight.

2. The resin composition according to claim 1, wherein the (C) component is a c1-c2-c1 block copolymer formed of polystyrene and hydrogenated polybutadiene.

3. The resin composition according to claim 1, wherein the (D) component is polystyrene having a weight-average molecular weight Mw of 170,000 to 210,000 and a molecular weight distribution Mw/Mn of 2.0 to 3.0.

4. The resin composition according to claim 1, wherein, in a situation in which an injection molding machine equipped with a spiral mold having a width of 8 mm and a shaping thickness of 2 mm is used to shape the resin composition with a cylinder temperature of 330° C., a mold temperature of 120° C., an injection pressure, as a gauge pressure, of 100 MPa, an injection rate of 50 mm/s, and an injection time/cooling time of 9 s/15 s, an obtained shaped article has a flow length L of 400 mm or more from a gate position.

5. A vehicle lighting fixture bezel formed of the resin composition according to claim 1.

6. The vehicle lighting fixture bezel according to claim 5, having a specific gravity of 1.10 or less and a water absorption rate of 0.4 mass % or less when allowed to absorb water at 60° C. and 95% RH for 1,000 hours.

7. The vehicle lighting fixture bezel according to claim 5, wherein, in a situation in which the vehicle lighting fixture bezel is left at rest in a 155° C. environment for 24 hours after undergoing aluminum vapor deposition, a change ΔRa of surface roughness Ra of the vehicle lighting fixture bezel between before and after being left is 10 nm or less.

8. The vehicle lighting fixture bezel according to claim 5, having a ratio Lmax/t of maximum flow length Lmax from a gate position and average thickness t of 150 or more.

9. The vehicle lighting fixture bezel according to claim 5, having an average thickness t of 3 mm or less.

* * * * *